(12) United States Patent
Pucha et al.

(10) Patent No.: US 11,240,298 B2
(45) Date of Patent: Feb. 1, 2022

(54) PEER-TO-PEER SYNCABLE STORAGE SYSTEM

(71) Applicant: Google LLC, Mountain View, CA (US)

(72) Inventors: Himabindu Pucha, Mountain View, CA (US); Raja Daoud, Mountain View, CA (US); Michael Burrows, Mountain View, CA (US)

(73) Assignee: Google LLC, Mountain View, CA (US)

( * ) Notice: Subject to any disclaimer, the term of this patent is extended or adjusted under 35 U.S.C. 154(b) by 185 days.

(21) Appl. No.: 15/284,078

(22) Filed: Oct. 3, 2016

(65) Prior Publication Data

US 2017/0099347 A1 Apr. 6, 2017

Related U.S. Application Data

(60) Provisional application No. 62/236,480, filed on Oct. 2, 2015.

(51) Int. Cl.
*H04L 29/08* (2006.01)
*G06F 16/178* (2019.01)
(Continued)

(52) U.S. Cl.
CPC ........ *H04L 67/1044* (2013.01); *G06F 16/176* (2019.01); *G06F 16/178* (2019.01);
(Continued)

(58) Field of Classification Search
CPC . H04L 67/1044; H04L 67/40; H04L 67/1097; H04L 67/1095; H04L 63/101;
(Continued)

(56) References Cited

U.S. PATENT DOCUMENTS 6,192,366 B1 2/2001 Ogawa
6,470,329 B1 10/2002 Livschitz
(Continued)

FOREIGN PATENT DOCUMENTS

CN 1609858 A 4/2005
CN 1897518 1/2007
(Continued)

OTHER PUBLICATIONS

"Syncbase Syncing Data", as published <https://vanadium.github.io/syncbase/guides/synchronization.html>, retrieved from the Internet Sep. 5, 2016.
(Continued)

*Primary Examiner* — Thu V Nguyen
*Assistant Examiner* — Angela M Widhalm de Rodrig
(74) *Attorney, Agent, or Firm* — Lerner, David, Littenberg, Krumholz & Mentlik, LLP

(57) ABSTRACT

A system for creating a sync group in a distributed system may include an offline electronic device having a short range communication transmitter and a storage service, and a computer-readable storage medium comprising one or more programming instructions. The system may receive a request from an application to create a sync group, and verify that the application has read access to the storage service. In response to verifying that the application has read access to the storage service, the system may create the sync group by receiving an indication of one or more objects stored in the storage service that are to be shared, identifying one or more members of the sync group, and assigning one or more permissions to the one or more members that are identified. The system may synchronize access to the objects among the electronic device and one or more member electronic devices.

19 Claims, 8 Drawing Sheets

(51) Int. Cl.
| | |
|---|---|
| *G06F 16/182* | (2019.01) |
| *G06F 16/188* | (2019.01) |
| *G06F 16/176* | (2019.01) |
| *H04W 4/80* | (2018.01) |
| *H04L 29/12* | (2006.01) |
| *H04L 29/06* | (2006.01) |

(52) U.S. Cl.
CPC .......... *G06F 16/182* (2019.01); *G06F 16/188* (2019.01); *H04L 61/2069* (2013.01); *H04L 63/101* (2013.01); *H04L 67/1095* (2013.01); *H04L 67/1097* (2013.01); *H04L 67/40* (2013.01); *H04W 4/80* (2018.02)

(58) Field of Classification Search
CPC .... H04L 61/2069; H04W 4/80; G06F 16/178; G06F 16/176; G06F 16/182; G06F 16/188
See application file for complete search history.

(56) References Cited

U.S. PATENT DOCUMENTS

| | | | |
|---|---|---|---|
| 7,178,029 B2 | 2/2007 | Knsper et al. | |
| 7,328,243 B2 | 2/2008 | Yeager et al. | |
| 7,536,476 B1 | 5/2009 | Alleyne | |
| 7,701,953 B2* | 4/2010 | Chen | H04L 12/5601 |
| | | | 370/395.1 |
| 7,840,543 B2 | 11/2010 | Guiheneuf et al. | |
| 7,885,925 B1 | 2/2011 | Strong et al. | |
| 7,949,606 B1* | 5/2011 | Sweet | G06Q 30/06 |
| | | | 705/51 |
| 8,229,888 B1* | 7/2012 | Roskind | H04L 12/4604 |
| | | | 707/621 |
| 8,527,461 B2 | 9/2013 | Ducott, III et al. | |
| 9,077,759 B2 | 7/2015 | Brouwer et al. | |
| 9,276,749 B2 | 3/2016 | Tenenboym et al. | |
| 9,800,416 B2 | 10/2017 | Tenenboym et al. | |
| 9,883,472 B1* | 1/2018 | Tamhane | H04W 56/001 |
| 2002/0009165 A1 | 1/2002 | Friedman | |
| 2002/0120763 A1* | 8/2002 | Miloushev | H04L 67/1023 |
| | | | 709/230 |
| 2003/0120665 A1 | 6/2003 | Fox et al. | |
| 2004/0024483 A1 | 2/2004 | Holcombe | |
| 2004/0088646 A1 | 5/2004 | Yeager et al. | |
| 2004/0156504 A1 | 8/2004 | Mo et al. | |
| 2005/0107104 A1 | 5/2005 | Rajkotia | |
| 2006/0020690 A1 | 1/2006 | LaChapelle et al. | |
| 2006/0052998 A1* | 3/2006 | Michelman | G06N 3/004 |
| | | | 703/22 |
| 2006/0161990 A1 | 7/2006 | Frey et al. | |
| 2006/0174204 A1* | 8/2006 | Jung | G06T 3/4092 |
| | | | 715/751 |
| 2007/0030824 A1* | 2/2007 | Ribaudo | H04L 51/38 |
| | | | 370/328 |
| 2007/0177627 A1 | 8/2007 | Raju et al. | |
| 2008/0005188 A1 | 1/2008 | Li et al. | |
| 2008/0021720 A1 | 1/2008 | Glinberg | |
| 2008/0263103 A1 | 10/2008 | McGregor et al. | |
| 2009/0318168 A1* | 12/2009 | Khosravy | G06Q 30/0241 |
| | | | 455/456.3 |
| 2010/0106713 A1 | 4/2010 | Esuli et al. | |
| 2011/0004636 A1* | 1/2011 | Parkkinen | H04L 12/66 |
| | | | 707/803 |
| 2011/0110568 A1* | 5/2011 | Vesper | G06F 19/321 |
| | | | 382/128 |
| 2011/0179089 A1 | 7/2011 | Idicula et al. | |
| 2012/0173950 A1 | 7/2012 | Jin et al. | |
| 2012/0190386 A1* | 7/2012 | Anderson | G01C 15/04 |
| | | | 455/456.3 |
| 2013/0013648 A1 | 1/2013 | Monjas Llorente et al. | |
| 2013/0031192 A1 | 1/2013 | Caspi | |
| 2013/0091214 A1* | 4/2013 | Kellerman | G06Q 10/00 |
| | | | 709/204 |
| 2014/0016644 A1 | 1/2014 | Vasseur et al. | |
| 2014/0030980 A1* | 1/2014 | D'Ambrosio | H04W 76/40 |
| | | | 455/41.3 |
| 2014/0040611 A1 | 2/2014 | Tenenboym et al. | |
| 2014/0115325 A1 | 4/2014 | Detienne et al. | |
| 2014/0136481 A1* | 5/2014 | Quan | G06F 9/4856 |
| | | | 707/617 |
| 2014/0189762 A1* | 7/2014 | Hainline | H04N 7/17318 |
| | | | 725/93 |
| 2014/0215574 A1 | 7/2014 | Erb et al. | |
| 2014/0222450 A1* | 8/2014 | Gray | G16H 40/20 |
| | | | 705/2 |
| 2014/0223019 A1* | 8/2014 | McCann | H04L 67/1044 |
| | | | 709/228 |
| 2014/0257953 A1* | 9/2014 | Kaplan | G06Q 30/0214 |
| | | | 705/14.16 |
| 2014/0303989 A1 | 10/2014 | Ferguson | |
| 2014/0351280 A1 | 11/2014 | Sagy et al. | |
| 2014/0379854 A1* | 12/2014 | Li | H04L 67/10 |
| | | | 709/217 |
| 2015/0019982 A1* | 1/2015 | Petitt, Jr. | H04W 4/029 |
| | | | 715/738 |
| 2015/0074407 A1 | 3/2015 | Palmeri et al. | |
| 2015/0127610 A1 | 5/2015 | Besen et al. | |
| 2015/0127733 A1* | 5/2015 | Ding | H04W 8/005 |
| | | | 709/204 |
| 2015/0163206 A1 | 6/2015 | McCarthy et al. | |
| 2015/0281353 A1* | 10/2015 | Mahkovec | G06F 17/30899 |
| | | | 709/203 |
| 2015/0310188 A1* | 10/2015 | Ford | G06F 21/10 |
| | | | 726/28 |
| 2015/0350308 A1* | 12/2015 | Cosentino | G06F 16/283 |
| | | | 709/202 |
| 2016/0037215 A1* | 2/2016 | Cardona | H04N 21/8456 |
| | | | 725/31 |
| 2016/0057184 A1* | 2/2016 | O'Brien | H04W 4/80 |
| | | | 709/205 |
| 2016/0099963 A1 | 4/2016 | Mahaffey et al. | |
| 2016/0142898 A1* | 5/2016 | Poitau | H04W 72/0446 |
| | | | 370/329 |
| 2016/0188706 A1 | 6/2016 | Momosaki et al. | |
| 2016/0191608 A1* | 6/2016 | Zaid | H04L 63/0407 |
| | | | 709/203 |
| 2016/0352526 A1* | 12/2016 | Adler | G06Q 10/10 |

FOREIGN PATENT DOCUMENTS

| | | |
|---|---|---|
| CN | 101964789 A | 2/2011 |
| CN | 103490886 A | 1/2014 |
| EP | 0872080 A1 | 10/1998 |

OTHER PUBLICATIONS

Introduction to Microsoft Sync Framework File Synchronization Provider (Oct. 2009).
FileSync/NDN: Peer-to-Peer File Sync over Named Data Networking (Mar. 2013).
Database Concepts, Tables and Table Clusters, https://docs.oracle.com/database/121/CNCPT/tablecls.htm#i25478, downloaded from Internet Oct. 29, 2015.
Database SQL Tuning Guide, Guidelines for Indexes and Table Clusters, https://docs.oracle.com/database/121/TGSQL/tgsql_indcl.htm#TGSQL870, downloaded from internet Oct. 29, 2015.
Database Administrator's Guide, Creating Clusters, <http://docs.oracle.com/cd/B28359_01/server_111/b28310/clustrs003.htm>, downloaded from internet Oct. 29, 2015.
Corbett et al., Spanner: Google's Globally-Distributed Database, published in the Proceedings of OSDI 2012, http://static.googleusercontent.com/media/research.google.com/en//archive/spanner-osdi2012.pdf.
International Search Report and Written Opinion dated Jan. 3, 2017, issued in Application No. PCT/US2016/054859.
Sandhu R.S. et al., "Access Control: principle and practice", IEEE Communications Magazine, IEEE Service Center, Piscataway, US, vol. 32, No. 9, Sep. 1, 1994, pp. 40-48.

(56) References Cited

OTHER PUBLICATIONS

U.S. Appl. No. 14/927,591, filed Oct. 30, 2015.
U.S. Appl. No. 15/284,116, filed Oct. 3, 2016.
International Preliminary Report on Patentability dated Apr. 12, 2018, for International Application No. PCT/US2016/054871. 7 pages.
International Preliminary Report on Patentability dated Apr. 12, 2018, for International Patent Application No. PCT/US2016/054895. 8 pages.
Extended European Search Report for European Patent Application No. 19180197.6 dated Sep. 27, 2019. 6 pages,
Anonymous: "Version vector—Wikipedia", Jun. 13, 2015 (Jun. 13, 2015), XP055626804. 2 pages. Retrieved from the Internet: URL: https://en.wikipedia.org/w/index.php?title=Version_vector&oldid=666811850.
Anonymous: "Wireless ad hoc network—Wikipedia", Sep. 27, 2015 (Sep. 27, 2015), XP055631350. 6 pages. Retrieved from the Internet: URL: https://en.wikipedia.org/w/index.php?title=Wireless_ad_hoc_network&oldid=682978409.
Examiner Fernando Correia Martins. E-mail Opinion on European Patent Application No. 16781634.7. Oct. 15, 2019. 4 pages.
First Office Action for Chinese Patent Application No. 201680056479.8 dated Jun. 18, 2021. 10 pages.
Liu et al. Access Control in Synchro-coroutine. Dec. 5, 2007. Computer Engineering. 3 pages. English translation of abstract only.
Hains. Efficient Static Checking of Dynamic Access Control in Shared Multiprocessor Environments. May 25, 2007. 2007 International Symposium on Collaborative Technologies and Systems. 5 pages.
Second Office Action for Chinese Patent Application No. 201680056479.8 dated Nov. 30, 2021. 5 pages.

* cited by examiner

PEER-TO-PEER SYNCABLE STORAGE SYSTEM

RELATED APPLICATIONS AND CLAIM OF PRIORITY

This patent document claims priority to U.S. provisional patent application No. 62/236,480, filed Oct. 2, 2015, the disclosure of which is fully incorporated into this document by reference.

BACKGROUND

It is often desirable to share data among multiple devices and multiple users. However, this may be difficult when one or more of the devices is offline, but still wishes to share data. In addition, users may have the ability to change the data simultaneously. It can be difficult to detect and resolve conflicts that may arise with respect to such changes in a distributed system.

SUMMARY

This disclosure is not limited to the particular systems, methodologies or protocols described, as these may vary. The terminology used in this description is for the purpose of describing the particular versions or embodiments, and is not intended to limit the scope.

As used in this document, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" means "including, but not limited to."

In an embodiment, a system for creating a sync group in a distributed system may include an offline electronic device having a short range communication transmitter and a storage service, and a computer-readable storage medium comprising one or more programming instructions. The programming instructions, when executed, may cause the electronic device to receive a request from an application to create a sync group, and verify that the application has read access to the storage service. In response to verifying that the application has read access to the storage service, the system may create the sync group by receiving an indication of one or more objects stored in the storage service that are to be shared, identifying one or more members of the sync group, and assigning one or more permissions to the one or more members that are identified. The system may synchronize access to the objects among the electronic device and one or more member electronic devices associated with the one or more members such that the objects are accessible via each of the member electronic devices when the member electronic devices are within range of the transmitter, where access to the objects by the member electronic devices is in accordance with the one or more permissions that are assigned.

Optionally, the system may assign a unique name to the sync group. The system may publish the unique name to a listing that is accessible by the member electronic devices.

Optionally, each of the member electronic devices may be offline.

Optionally, the system may detect a network connection and, in response, send a request to create the sync group to the sync group server, and by the sync group server, create a version of the sync group at the sync group server and synchronize objects and metadata with the electronic device and one or more of the member electronic devices.

Optionally, the system may generate an access control list (ACL) that indicates which of the member electronic devices are permitted to access the objects.

In an embodiment, a system for creating a sync group in a distributed system may include an electronic device comprising a storage service, and a computer-readable storage medium having one or more programming instructions. The programming instructions, when executed, may cause the electronic device to receive a request from an application to create a sync group, and verify that the application has read access to the storage service. The system may, in response to verifying that the application has read access to the storage service, create the sync group by receiving an indication of one or more objects stored in the storage service that are to be shared, identifying one or more members of the sync group, and assigning one or more permissions to the one or more members that are identified. The system may identify a sync group server associated with the sync group, send a notification to the sync group server notifying the sync group server that the sync group has been created, and synchronize access to the objects among the electronic device and one or more member electronic devices associated with the one or more members such that the objects are accessible via each of the member electronic devices, where access to the objects by the member electronic devices is in accordance with the one or more permissions that are assigned.

Optionally, the system may assign a unique name to the sync group. The system may publish the unique name to a listing that is accessible by the member electronic devices.

Optionally, the system may generate an access control list that indicates which of the member electronic devices are permitted to access the objects.

Optionally, the system may communicate with the sync group server using one or more remote procedure calls.

DETAILED DESCRIPTION

Figure 1A:
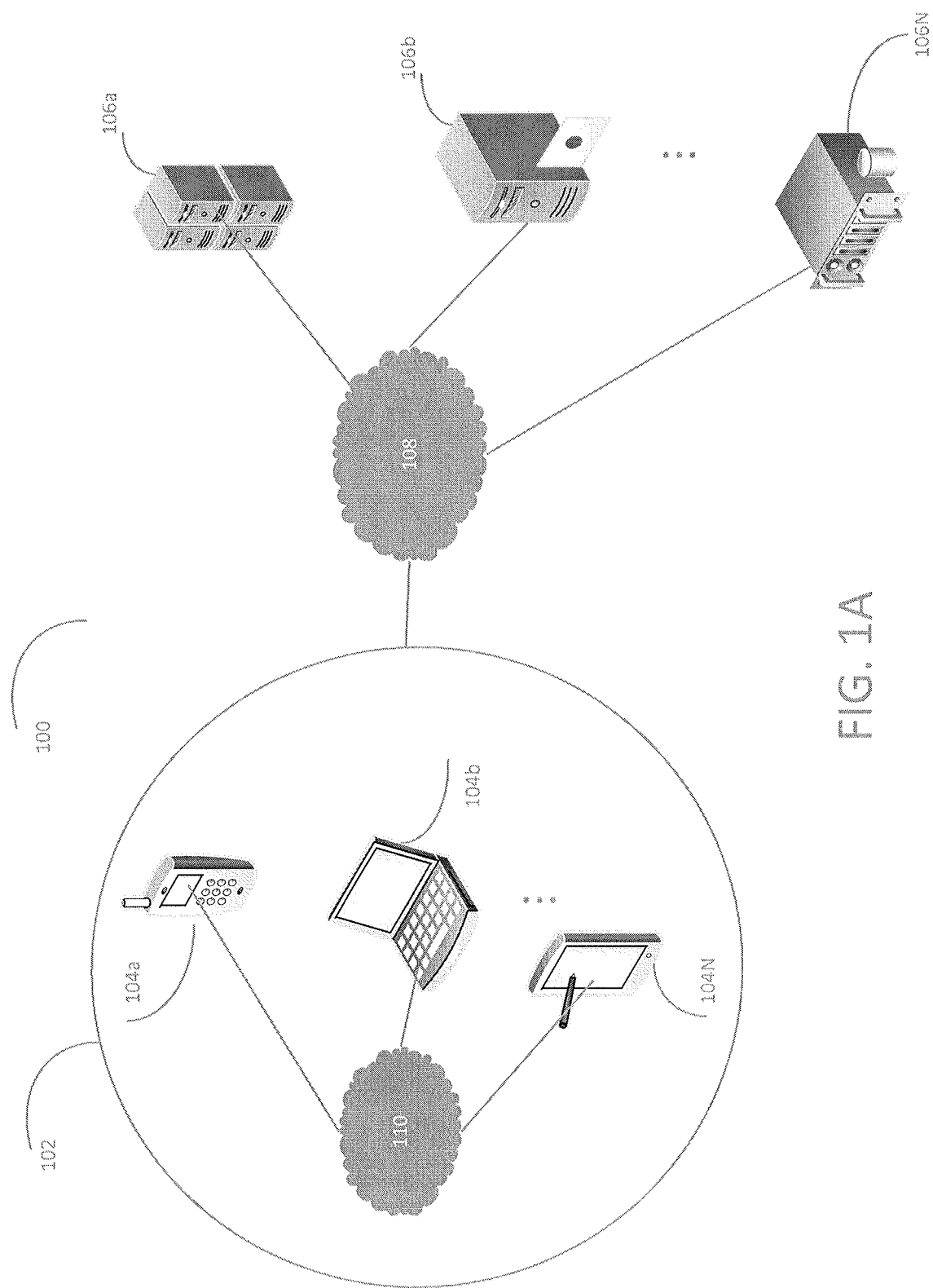
FIGS. 1A and 1B illustrate various embodiments of a distributed peer-to-peer synchronization system.

The following terms shall have, for purposes of this application, the respective meanings set forth below:

An "access control list" or "ACL" is a list, table or other data structure that identifies the permissions that are attached to a particular object or set of objects. The permissions may involve a single device or multiple devices.

A "dynamic name server" refers to an electronic device that is capable of allowing clients to create a name and associate a network endpoint, such as, for example, an IP address or a port number, with that name. One or more other electronic devices may then be able to look up the name in the dynamic name server, find the corresponding endpoint, and communicate with it.

An "electronic device" or a "computing device" refers to a device that includes a processor and memory. Each device may have its own processor and/or memory, or the processor and/or memory may be shared with other devices as in a virtual machine or container arrangement. The memory may contain or receive programming instructions that, when executed by the processor, cause the electronic device to perform one or more operations according to the programming instructions. Examples of electronic devices include personal computers, servers, mainframes, virtual machines, containers, gaming systems, televisions, and mobile electronic devices such as smartphones, personal digital assistants, cameras, tablet computers, laptop computers, media players and the like. In a client-server arrangement, the client device and the server are each electronic devices, in which the server contains instructions and/or data that the client device accesses via one or more communications links in one or more communications networks. In a virtual machine arrangement, a server may be an electronic device, and each virtual machine or container may also be considered to be an electronic device. In the discussion below, a client device, server device, virtual machine or container may be referred to simply as a "device" for brevity.

A "member" refers to an electronic device that has joined a sync group. A member may be identified by a globally unique name of the device and/or metadata associated with the device such as, for instance, sync priority.

An "object" is a process, data set, or other resource, function or transaction for which a server controls access by authorized clients.

A "prefix" refers to one or more key prefixes (or key ranges) that are used to specify the subset of the data to synchronize. For example, a sync group may be defined on the prefixes "foo" and "bar" within a database, which synchronizes all entries with keys that start with either the "foo" or "bar" strings. This set of prefixes may not be modified after the creation of a sync group.

In this document, the terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

A "structured store" refers to a computer-readable storage medium that includes at least a portion of objects to be synchronized between or among devices. A structure store may include a key-value store, a mapping of string keys to data types, a relational database, and/or the like.

A "storage service" refers to a computer-readable storage system that facilitates synchronization of objects across electronic devices in a peer-to-peer fashion.

A "sync group" is intended to refer to a group of devices that are permitted to synchronize a set of data between each other and/or to a data storage facility.

A "sync group name" refers to a globally unique name that identifies a sync group.

A "sync group server" refers to an electronic device in communication with a sync group. A sync group server may store information, such as metadata, associated with a sync group.

Except where specifically stated otherwise, the singular term "processor", "processing device", "electronic device" or "computing device" is intended to include both single-processing device embodiments and embodiments in which multiple processing devices together or collectively perform a process.

In this document, the terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

FIG. 1A illustrates various embodiments of a distributed peer-to-peer synchronization system. As illustrated by FIG. 1A, a system 100 may include a sync group 102 having two or more electronic devices 104a-N. Although FIG. 1A shows one sync group B, one or more electronic devices 104a-N may belong to one or more other sync groups. The electronic devices 104a-N in a sync group 102 may belong to one or multiple users. For instance, a sync group 102 may include a mobile phone, a tablet and a laptop computer that belong to a single user that wishes to synchronize data amongst these devices. In another example, a sync group 102 may include a mobile phone associated with a first user, a tablet associated with a second user, a mobile phone associated with a third user, and a laptop computer associated with a fourth user. Additional and/or alternate number of users and/or types of electronic devices may be used within the scope of this disclosure.

The devices in each sync group 102 will store an ACL or other data structure that identifies the other devices that are members of the sync group. In this context, the term "device" may refer to an actual electronic device identifier, or to an identifier of a user who is using a particular electronic device. In various embodiments, a device associated with read "R" or write "W" permission may join a sync group. An "A" permission may identify a device that acts as a sync group administrator. A sync group administrator may perform certain actions that non-administrators are not permitted to perform such as, for example, permit new devices to join a sync group, remove devices from a sync group, modify an applicable ACL and/or the like. In an embodiment, a sync group may also specify a conflict resolution policy to use to reconcile synchronization conflicts. Multiple sync groups can be defined and can overlap or be nested. In an embodiment, sync group metadata may be decentralized and may exist on all of the nodes participating in the sync group. Administrators of a sync group may be the ones allowed to change or modify the metadata. This metadata may be synchronized using a peer-to-peer (p2p) sync protocol.

As shown in FIG. 1A, a sync group 102 may be in communication with one or more sync group servers 106a-N via a communication network 108, such as, for example, a wireless phone network, the Internet, an intranet, a local area network, a wide area network, another type of network, or any combination of these. In various embodiments, a sync group server 106a-N may be a part of a sync group 102. A sync group server 106a-N may store and manage data and/or metadata associated with a sync group 102. Metadata may include, without limitation, a listing of electronic devices that are permitted to join the sync group, a listing of current members of a sync group, the data to be synced between which devices of the sync group, and/or the like.

In certain embodiments, a sync group server 106*a*-N may be utilized when devices join and leave a sync group 102. Often it is convenient to provision the sync group server 106*a*-N on a non-mobile device, such as, for example, a server in the cloud, so that the sync group server 106*a*-N is less likely to be lost or stolen. In other embodiments, a sync group server 106*a*-N may be implemented as a mobile electronic device or other type of electronic device. In yet another embodiment, a sync group 102 may not be associated with a sync group server 106*a*-N. Rather, metadata may be managed by administrators inside the sync group 102.

Figure 1B:
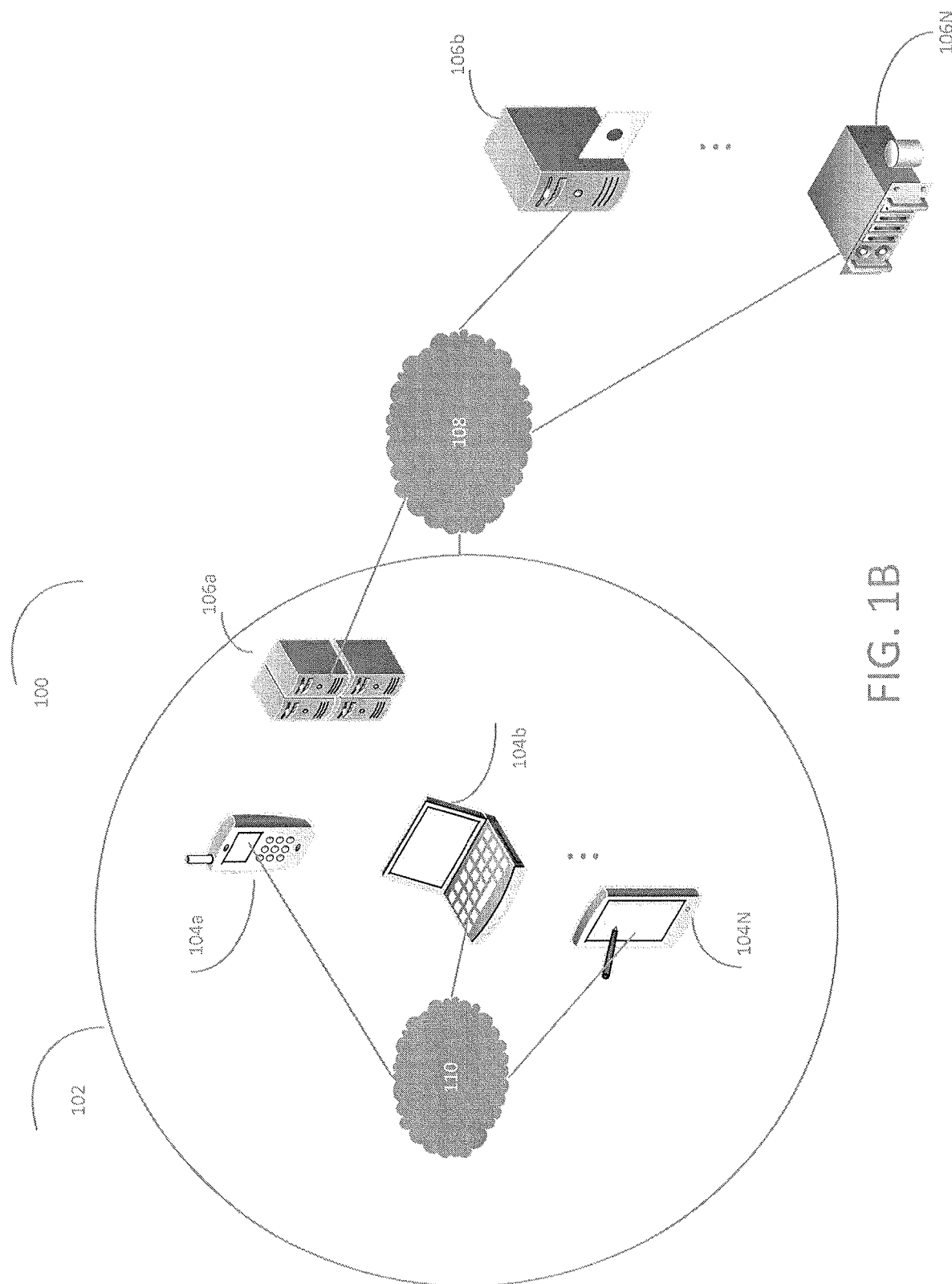

In various embodiments, a sync group server 106*a*-N (or other server) may be considered a member of a sync group, as illustrated by FIG. 1B. For example, if a sync group is created while an electronic device is online, or if an electronic device later connects to the Internet after creating a sync group while offline, a sync group server may be a member of the sync group. In this way, the sync group sever may backup data and/or server as a convenient place for electronic devices to obtain recent updates.

One or more electronic devices 104*a*-N may be able to communicate with one or more other electronic devices over a communication network 110 such as, for example, a wireless phone network, the Internet, an intranet, a local area network, a wide area network, another type of network, or any combination of these. In other embodiments, the communication network 110 may be a short range or near field communication network. As such, electronic devices may be able to communicate with one another in the absence of an Internet connection. Subsequent management of the newly created sync group can be transferred to a sync group server via an Internet or other network connection when the devices are able to communicate via the network.

In certain embodiments, a sync group may be created when one or more of the electronic devices that are to be part of the sync group are offline, meaning that they are not connected to the Internet. When a sync group is created, the creator becomes the default manager or administrator of the new sync group. As devices join the sync group (as permitted by the ACL for the sync group), they form a loosely coupled distributed system to perform sync group administration. This may include bootstrapping other members of the sync group who are allowed to join and admitting and propagating changes to the metadata of the sync group, among other things.

A sync group may also be synchronized in a peer-to-peer fashion. Administrators may make themselves available via a discovery service so that members can reach them even when they are offline. Sync group management is robust as it does not depend on any one administrator. It also allows sync group creation to proceed when the creator is not connected to the Internet.

In various embodiments, a device user may wish to establish a sync group while the device is offline. For example, User 1 of Device A may be camping with User 2 of Device B and User 3 of Device C, and none of the devices may have access to an Internet connection. However, User 1 may want to create a sync group that includes Device B and Device C so that the three users can share photos from their camping trip.

User 1 may access an application on her device to store her photos to be shared, which may have the same prefix such as, for instance "Camping Trip." User 1 may select an option to share the identified photos, and may be given an option to limit sharing to a set of user identities. She may identify Users 2 and 3.

The application creates a sync group on behalf of User 1. Since User 1 is offline, creation of the sync group at the sync group server remains pending. But the sync group is created on Device 1. Device 1 sends a request to Device 2 and Device 3 to join the sync group using short range or near field communication. Once the request is accepted, Devices 1, 2, and 3 synchronize and share photos or other objects. When Device 1 regains Internet connectivity, the creation of the sync group at the sync group server completes. New members can then join the sync group via the sync group server, and existing members can sync their sync group metadata with the sync group server.

In certain embodiments, a sync group creator can nominate a default administrator (possibly a device in the cloud) for other sync group members to use. If a default administrator is specified, that administrator is added to the sync group as soon as it is online and reachable. Sync group administrators may periodically ping the default administrator to join the sync group until it accepts or rejects the request. The resulting group state can be recorded and propagated to other group administrators via a synchronization protocol. This approach helps creators and/or administrators offload the responsibility of administration to a more powerful sync group member. As such, sync group management achieves offline capabilities and load balancing.

The following illustrates an example sync group data structure according to an embodiment:

```
const (
    // Conflict resolution policies
    LastWins              = byte(0)   // last change wins
    AppResolves           = byte(1)   // app does conflict resolution
    // App resolution choices; replies from the app to storage service.
    // The app is still responsible for writing deterministic
    // and convergent app resolvers.
    ChooseNew             = byte (0)  // new resolution value given
    ChooseLocal           = byte (1)  // pick the local value
    ChooseRemote          = byte (2)  // pick the remote value
    // ConflictInfo entry types in a batch
    WriteSet              = byte (0)  // part of batch write-set
    ReadSet               = byte (1)  // part of batch read-set
    ScanSet               = byte (2)  // part of batch scan-set
)
// SyncGroupSpec contains the sync group specification.
// Prefixes and ConflictResolver cannot be modified later.
type SyncGroupSpec struct {
    Prefixes              [ ]string
    Perms                 access.Permissions
    Description           string
    DynamicNameServer     [ ]string
    ConflictResolver      Byte
    Private               bool
}
// Sync GroupMemberInfo contains per-member metadata.
// Each member provides this self-info upon create or join.
type SyncGroupMemberInfo struct {
    SyncPriority          uint8
}
// ConflictInfo contains information to fully specify a conflict
// for a key, providing the (local, remote, ancestor) tuple.
// For ScanSet type, Key is the prefix and the values are empty.
type ConflictInfo struct {
    Type                  byte
    Key                   string
    LocalValue            any
    RemoteValue           any
    AncestorValue         any
    Continued             bool
}
```

-continued

```
// ResolutionInfo contains the application's reply to a
// conflict for a key, providing the resolution value.
type ResolutionInfo struct {
    Key         string
    Value       any
    Choice      byte
    Continued   bool
}
```

In various embodiments, communication may occur in via one or more remote procedure calls (RPCs). For instance, an application may communicate with a storage service via RPCs, and a storage service may communicate with a storage service server via RPCs. RPCs to a storage service from an application may be handled by a sync group server module within the storage service. Example permissions to make certain RPCs are explained below according to an embodiment:

```
type SyncGroup interface {
    CreateSyncGroup(sgName string,
        spec SyncGroupSpec,
        myInfo SyncGroupMemberInfo) error
    JoinSyncGroup(sgName string, myInfo SyncGroupMemberInfo)
        (spec SyncGroupSpec | error)
    GetSyncGroupMembers(sgName string)
        (members map[string]SyncGroupMemberInfo | error)
    GetSyncGroupSpec(sgName string)
        (spec SyncGroupSpec, version string | error)
    SetSyncGroupSpec(sgName string,
        spec SyncGroupSpec,
        version string) error
    LeaveSyncGroup(sgName string) error
    EjectFromSyncGroup(sgName, member string) error
    DestroySyncGroup(sgName string) error
    StartConflictResolver(sgName string)
        stream<ResolutionInfo, ConflictInfo> error
}
```

In an embodiment, an application may have at least Read access to make sync group-related RPCs. In addition, the application may have Read access to join a sync group. The application may need administrator privileges to perform "eject", "destroy" or "set" operations. To create a sync group, a data ACL may exist at each sync group prefix, and the calling application should have at least Read access on the ACL. An application may not need additional permissions to leave a sync group.

Creating a Sync Group

Figure 2:
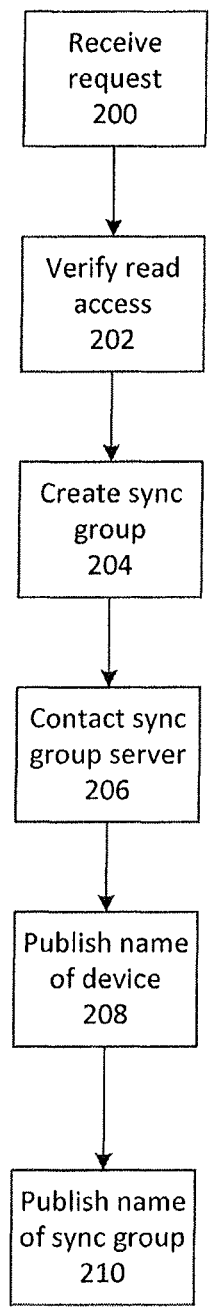
FIG. 2 illustrates a flow chart of an example method of creating a sync group according to an embodiment.

FIG. 2 illustrates a flow chart of an example method of creating a sync group according to an embodiment. As shown in FIG. 2, a storage service may receive 200 a request from an application (such as a storage service agent) to create a new sync group. The storage service may verify 202 that the application from which the request was received has read access to the storage service.

In response to verifying that the application has read access to the storage service, a sync group may be created 204 locally within the storage service so long as the sync group does not already exist in the storage service. In creating the sync group, a storage service may assign the sync group a globally unique name. The name may include the name of a sync group server. For example, the name may include the name of a sync group server as a prefix. The storage service may define key prefixes that constitute the sync group. A prefix refers to an indication that specifies the subset of data and/or the ACLs to synchronize. For example, a sync group may be defined on the prefixes "foo" and "bar" within a database, which synchronizes all entries with keys that start with either the "foo" or "bar" strings.

In an embodiment, a storage service may receive an indication of one or more objects that are to be shared with members of the sync group. The objects may be data objects such as, for example, documents, images, photos, messages, and/or the like. A storage service may receive an indication of one or more objects that are to be shared from a user. For instance, a user may specify which objects from the storage service are to be shared with members of the sync group.

In various embodiments, a storage service may identify one or more potential members of the created sync group and one or more permissions associated with such members. A storage service may identify one or more potential members based on input from a user. For example, a user may identify a member by providing a name or other identifier of the member. A storage service may identify a conflict resolution policy that is associated with the sync group. A conflict resolution data policy may specify how conflicts pertaining to the synchronization of data are to be handled.

Referring back to FIG. 2, a storage service may contact 206 the sync group server assigned to the new sync group by sending a notification on behalf of the application to inform the sync group server that the new sync group has been created and exists. In an embodiment, a storage service may send the notification using one or more remote procedure calls (RPCs). The storage service server may return an error if the sync group already exists or if the application lacks the appropriate permissions to create the sync group. If the storage service receives an error from the sync group server, the storage service may not create the requested sync group and may inform the requesting application of the error.

In an embodiment, the storage service may not be able to contact the sync group server because the sync group server is unreachable. For example, the device associated with the storage service and/or the sync group server may be offline. In this situation, the storage service may remember the pending contact request until the sync group server is reachable, and continue creating the sync group offline. The storage service may try to contact the sync group server at a later time to synchronize the new sync group and associated metadata. For instance, when the storage service detects an Internet or other network communication, it may send a request to create the sync group to the sync group server. The sync group server may create the sync group and synchronize the applicable objects and metadata with the appropriate devices.

In an embodiment, the storage service may publish 208 the name of the device at a dynamic name server specified by the sync group. The storage service may publish 210 the name of the created sync group in a neighborhood dynamic name server so that offline joiners can locate the sync group.

Once members have joined the sync group, the storage service may synchronize access to the objects that are to be shared amongst the members such that those objects are accessible via one or more of the members' electronic devices.

If the storage service is offline, then the objects may be shared with the devices of one or more members using short range wireless communication technology such as, for instance, Near Field Communication (NFC), Bluetooth, Bluetooth low energy, radio frequency identification (RFID) or another technology. For example, electronic devices may include transmitters and/or receivers that allow them to communicate with other devices within range over short range protocols. In certain embodiments, one or more devices of one or more members may also be offline, but able to communicate using short range wireless communication technology.

Joining a Sync Group

To join a sync group, an electronic device either obtains the sync group name out-of-band or may already know it by convention. A storage service may take the following steps when joining a sync group:

Verifies that the requesting application has read access to the database.

Attempts to join the sync group by contacting the sync group server specified in the sync group name on behalf of the app (app blesses the store).

If the sync group server is unreachable, search the neighborhood for endpoints corresponding to the sync group name. If an endpoint is found, issue a Join to it; otherwise the Join fails.

Note: to stop a neighborhood device from masquerading as another sync group administrator, the sync group name may include a list of blessing prefixes for the administrators to be checked during RPCs.

Store locally the sync group metadata returned.

Publish the device name in the dynamic name server specified by the sync group.

If the joiner is a sync group administrator (check the ACL), publish the sync group name in the neighborhood dynamic name server as another location for other members to call Join.

On the sync group server side, when a Join RPC is received, it verifies that the joiner is allowed in by the sync group ACL. It adds the device to the list of joiners, which is also synchronized along with other sync group metadata.

Sync Group Metadata Synchronization

A storage service may track the sync groups known by the device, either as a member or an administrator. During p2p sync with other devices, for each sync group, before the exchange of data, the sync group metadata may be synchronized. In other words, the sync group membership information is effectively part of the sync group itself, but may be transmitted first. This may be done by leveraging a p2p sync protocol used to synchronize app data. Each sync group's metadata may be tracked using a generation vector (genvec) and entries in a directed acyclic graph. A genvec may be a data structure that identifies how far through an electronic device's history (or various electronic devices' histories) a given electronic device has seen. This may allow devices to quickly identify and exchange the recent modifications in each sync group, and detect conflicts to resolve. A sync initiator device may send a list of sync groups it has in common with the responder and their genvec to the responder. The responder computes genvec differences and replies with the changes to the sync group, and each sync group's updated genvec. For each sync group in the reply, the initiator may update its DAG, detect conflicts, and take the following actions:

| Conflict Detected | Initiator is Administrator | Action |
| --- | --- | --- |
| false | — | accept change, update local SG copy |
| true | false | defer resolution, no local SG changes |
| true | true | resolve conflict, update local SG copy |

Conflict resolution may be automatically performed by performing a three-way merge of the changes:

Prefixes: cannot be changed.
Conflict Resolver Policy: cannot be changed.
Privacy: cannot be changed.
Description: last timestamp wins.
Permissions: for each of the "Allow" and "Deny" sets, merge entries per (tag, pattern) from the 3-way difference, applying the additions and deletions from both differences.
Dynamic Name Servers: merged per-record from the 3-way difference, applying the additions and deletions from both differences.
Membership set: merged per member record from the 3-way difference, applying the additions and deletions from both differences.

The synchronization of the sync group metadata happens first in a sync cycle. This allows the device to know the most recent sync group ACL and membership sets before starting a data synchronization cycle.

Leaving a Sync Group

A member may call LeaveSyncGroup( ) to terminate its involvement in a sync group. A storage service may send an RPC to one of the sync group administrators to convey the request, and cleans up the local sync group state. The sync group data is kept in the store. If it cannot contact any administrator, it can proceed to clean-up its sync group metadata locally and stop participating in sync. When others attempt to sync with it, it will reject them (unknown sync group) and they can do their own cleanup and, if they are an administrator, update the membership set.

Ejecting a Sync Group Member

When a sync group administrator needs to eject a sync group member (e.g., lost or stolen device), it modifies the sync group ACL to deny access to this member (i.e. remove its blessing), and it removes the member from the list of joiners. This metadata change propagates to other members, and each of them stops synchronizing with that member. If the denied member is reachable, it is sent an eject message to indicate that it should clean up its local state. Until the ACL change propagates to all sync group members, the denied member can continue to sync with some members, and its data updates will be accepted. This behavior is similar to the data sync protocol when an ACL denies access to a member.

Offline vs. Online

A sync group may be created when the creator is offline, and not able to reach the sync group server contained in the sync group name. Contacting the remote server will remain pending until it is reachable, at which time it learns about the sync group. Optionally, the creator can create the sync group locally using its server name in the sync group name and bypass the step where a remote server is contacted to inform it of the sync group. Other members can join the sync group by contacting any available administrator members via the neighborhood dynamic name server.

Sync Group Blessings

Instead of using the app blessing during sync, the sync group server may bless a new joiner indicating that it is now a member of the sync group. To enable such blessings to be handed out in a multi-master and potentially disconnected setting, and to ensure that the blessings originate from a device besides the creator (e.g., alice/phone is creating a sync group for the chess club, but would like the blessings to be of the form chessclub/sgserver/<sgname>), a creator would need to a priori cache the blessings from sync group servers it intends to use for creating a sync group.

Using sync group blessings may provide the following advantages:

Confirmation that a potential sync group member is able to sync with another member if it has joined the sync group.

Allow syncing to proceed even if the existing sync group members are at an older version of the ACL and are still unaware of the member that just joined. The new joiner may bring the ACL of the old members up-to-date.

A sync group owner who wishes to enforce tighter control over the sync group has the entire blessing machinery at his or her disposal (caveats, revocation, etc).

Sync Group ACLs and Data Prefix-ACLs

Sync group ACLs control access to the sync group during a sync operation. They are used to verify that the remote device is a member of the sync group. The database ACL and the longest prefix-ACL (most specific ACL for a key) control app access to the data, whether through the API or during the sync data exchange. When an app accesses the database, the following ACL checks may be passed: database ACL, table ACL, longest matching prefix-ACL. When a device fetches sync updates, the following ACL checks may be passed for each sync group it participates in: sync group ACL and longest matching prefix-ACL.

In an embodiment, a sync group may not be created without having prefix-ACLs already set at each of the sync group prefixes. These prefix-ACLs may be synchronized, and may be considered to be "inside" the sync group. This helps guarantee that all sync group members follow the same ACLs because all data entries within the sync group are controlled by prefix-ACLs that are also part of the sync group, not "leaked" from ACLs that are "outside" the sync group.

Interaction between Sync Group ACLs and Prefix ACLs

Joining and leaving a sync group may not affect the local access to the database. Likewise, sync access to data within a sync group may depend on metadata that is synchronized as part of the sync group (the sync group ACL and all data prefix-ACLs within the sync group range), and all members of the sync group may get the same behavior even if their ACL outside the realm of the sync group changes locally (e.g. shorter prefix-ACL than the sync group prefix).

When a prefix-ACL is defined on the same prefix as a sync group ACL, the prefix-ACL may be considered to be "inside" the sync group and may be synchronized as well. This means it is considered to be deeper in nesting and thus overrides the sync group ACL in the "longest-match" evaluation.

A special case to handle in order to preserve this property of same behavior across sync group members—what happens if the longest matching prefix-ACL for the sync group data is outside the realm of the sync group itself? For example, the sync group is on prefix "foo" but the app has defined a prefix-ACL at "f" and that ACL may be different across devices. To preserve the same behavior, a fallback rule may be used: if the longest matching prefix-ACL for a sync group data entry is shorter than the sync group prefix, the sync group ACL is used instead. This way, prefix-ACLs outside the sync group do not leak their influence into the sync group.

For example, consider three sync groups with overlap and nesting, along with two prefix-ACLs:

SG1 on prefixes "foo" and "bar" with SG-ACL1
SG2 on prefixes "foo" and "baz" with SG-ACL2
SG3 on prefix "foobar" with SG-ACL3
ACL4 a prefix-ACL on "foo1"
ACL5 a prefix-ACL on "foobar1"

A device that syncs on SG1 may pass SG-ACL1. This gives it all data under the "bar" prefix since there are no further controlling ACLs. For the "foo" prefix, it needs to pass ACL4 for the data under "foo1" and ACL5 for the data under "foobar1" and otherwise receives the remaining data under the "foo" prefix. Similarly, a device that syncs on SG2 may pass SG-ACL2. This gives it all data under the "baz" prefix and the data under "foo" except for the subsets under "foo1" and "foobar1" for which it also needs to pass ACL4 and ACL5 respectively. A device that syncs on SG3 may pass SG-ACL5. This gives it the data under "foobar" except for the subset under "foobar1" for which is may also pass ACL5. A device that syncs on multiple sync groups receives the union of the data it is allowed to access under the rules above.

Auto-Join Capability

To provide seamless synchronization experience across all of a user's devices, auto-join capability may be used. At storage service setup time, a user may have the option to enable the auto-join functionality. This creates a single autojoin sync group for that user to exchange information about application sync groups. Autojoin agents running on every user device may be part of that sync group. The autojoin agent on each device may detect when an application creates or joins a sync group and represents it as an entry in the autojoin sync group. Autojoin agents on all other devices of that user react to new entries in the autojoin sync group and automatically join the application sync groups specified (if allowed).

The following illustrate example use cases involving the creation and joining of sync groups according to various embodiments.

Use Case 1

Alice works for Company A and wants to share some documents about a project that are stored in a storage service with her colleagues Bob and Carol for collaboration. The documents are managed by a File Manager (FM) application. Alice accesses the FM application on one of her electronic devices to select the documents to sync. Alice specifies that she would like to share the selected documents with users companyA/Bob and companyA/Carol. The FM application creates a sync group on Alice's behalf using the storage service. The sync group name concatenates a sync group server name with a unique identifier. For example, the name of the sync group may be "/companyA/sgserver/A12HJU." The FM application may set up one or more permissions and prefixes for the sync group. The permissions and/or preferences may be based on Alice's preferences. For instance, Alice may specify a permission "alldevices" for Carol and Bob, meaning that they may join the sync group using any of their electronic devices that are members of each user's respective "alldevices" ACL group. For example, Alice may be including all of Bob's electronic devices and all of Carol's electronic devices. Alternatively, certain electronic devices may be specified. Example permissions are illustrated as follows:

```
Perms = {
    <grp: companyA/aclgrpserver/alice/alldevices>/FM:RWA
    <grp:companyA/aclgrpserver/bob/alldevices>/FM:RW
    <grp:companyA/aclgrpserver/carol/alldevices>/FM:RW
}
Prefixes = "Project"
```

Alice may inform Bob and Carol of the sync group name. For example, Alice may inform them of the name via email, NFC communication, the scanning of a code, or simply by telling them verbally, among other ways.

Bob and Carol may join the sync group via the FM application on their electronic devices. For instance, Bob may request via the FM application that his electronic device, for example, his laptop, join the sync group. As Alice has permitted Bob to join the sync group using any of his devices, Bob is allowed to join the sync group so long as his laptop is a member of Bob's alldevices ACL group. The storage service may receive the names of the device(s) that have joined the sync group, and may start a sync operation with those devices. After synchronization has occurred, Bob may be able to view the documents that Alice shared with him on his laptop. These documents may include "Project" as a prefix.

Use Case 2

Alice wants to edit photos with her friends Dave and Carlos while camping. Alice uses the FM application to store the photos to be shared, and they all have the prefix "Camping Trip." Alice selects the "Sharing→Create" option on the folder containing these photos. The FM application presents Alice with the option to limit sharing of these photos to a set of user identifies. She enters v23/Dave and v23/Carlos to specify that the photos are to be shared with Dave and Carlos. Her v23/Alice identity may be automatically added.

The FM application may create a sync group on Alice's behalf using a storage service. The sync group name concatenates a sync group server name with a unique identifier. For example, the name of the sync group may be "/domain/sgserver/A12HJU." The FM application may set up one or more permissions and prefixes for the sync group. The permissions and/or preferences may be based on Alice's preferences. Example permissions are illustrated as follows:

```
Perms = {
    <grp: domain/aclgrpserver/alice/alldevices>/FM:RWA
    <grp: domain/aclgrpserver/carlos/alldevices>/FM:RW
    <grp: domain/aclgrpserver/dave/alldevices>/FM:RW
    }
Prefixes = "Camping Trip"
```

Since Alice is offline, the creation of the sync group at the sync group server remains pending, and is created on Alice's electronic device. Carlos and Dave may join the sync group in a manner similar to that described above in Use Case 1. Alice's photos may appear on Carlos and Dave's devices, and they may synchronize their photos so long as their devices are within range of Alice's device. Since the three devices learned about each other's names in both the neighborhood and the global dynamic name servers, they will continue to share data even when they return to their homes in different countries. When Alice regains connectivity, the creation of the sync group continues and completes at the sync group server. New joiners can use this sync group server for joining, and existing members can sync their metadata with this server.

Use Case 3

Application Z app developer, Alice, wants to provide a button for Alice to make the app multi-device capable. Alice has to indicate via the application user interface whether she wants her Application Z app to span across her devices.

Application Z app creates a new sync group, with a name computed from Alice's identify (e.g., "/domain/sgserver/applicationz/v23/Alice"), to sync this information using the permissions: <grp:domain/aclgrpserver/alice/alldevices>/applicationz: RWA The sync group may also created locally on her device so her other devices could discover it in the neighborhood. So if Alice has several devices with her while offline (e.g., at the camp fire), they can create and join the sync group without access to the "/domain/sgserver" service. They should all have the ACL Group already cached locally so the permission check can proceed without access to "domain/aclgrpserver" service. The sync group prefixes may be chosen by the app according to its schema and the ranges of entries to synchronize across the devices. On Alice's other devices, she enables the multi-device mode using the app user interface, which triggers the app to join the sync group.

Use Case 4

Application Z app developer, Alice, wants to set up the app to share top scores across gaming players. The developer decides that sharing top scores across players is a mandatory feature of the app. The Application Z server creates a sync group "/domain/sgserver/applicationz/topscores" with the central sync group server. This sync group name can now be part of the Application Z app when it is installed. The permissions allow Application Z apps to join: {v23/applicationz: RW}. This means each installed Application Z app needs to be given a blessing of the form v23/applicationz/Alice/D1 by the Application Z server when it registers with it. It will present this blessing to join the sync group. The app joins this sync group the next time it runs while online. Until then this part of its database, the "top-scores" table, is not yet synchronized. The app creates/updates its "top-scores/Alice-D1" entry to maintain the local top-10 scores for example. A prefix-ACL on that object allows local RW access and read-only access by the central server (v23/Alice/D1/applicationz: RW and v23/applicationz/applicationzadmin: R). The central server's "top-scores" folder gathers the top-10 scores entries from all players. It is the one sync group member that can read them all. It computes the global top-10 scores list and writes it into the "top-scores/applicationzadmin" entry. The central server has RW access to that entry, all players have read-only access to it. This means the Sync Group has N+1 members. An alternative option is mentioned below.

The updated global top-10 scores entry is received by all players and the app displays it in its user interface. The players have no control or involvement in how Application Z chooses to use this sync group and its internal schema choices to gather/reduce/broadcast top-10 scores across all players. There was no need for out-of-band communication between players and the users were not asked to configure the sync group. All they have to do is install the app.

In an alternate embodiment, Application Z may use two sync groups. For example:
  "top-scores": shared by all players, used to broadcast the global top-10 scores; the server has RW access and all players have read-only access;
  "top-scores-Alice-D1": a per-user per-device sync group of two members, the device and the Application Z server, used by the server to gather local top-10 scores; the server has R access and the device has RW access. The server would register to be a member of N+1 sync groups in this case.

In various embodiments, a conflict may exist if an object has been modified independently by two devices at substantially the same time. The conflict is detected during cross-device synchronization when some device becomes aware of both modifications. The device that discovers the conflict will, if its permissions allow, try to resolve the conflict by choosing between the modification or perhaps by combining them in some way into one new modification.

In certain embodiments, a storage service may have features that allows it to handle conflict resolution in the presence of ACLs. For example, ACLs may require that data written at one device not be synced to a second device that has insufficient permission. Instead, enough information is transmitted to a device to indicate that data is missing, but not what it is. A third device might learn of these changes from the second device, but be unaware of what the changes are because the second device is lacking that information. This may allow the third device to detect that a conflicting update has occurred, but not yet to resolve the conflict. A later sync between the first device and the third may transfer enough information to fill in the missing pieces of the third device's knowledge, and allow conflict resolution. Further, a device that previously lacked permission to see certain data may be granted that permission at some point, perhaps leaving it with information about recent versions of a data item, but not earlier versions (since it had no permission to access them at the time they were current). These considerations lead to set of rules for handling syncing and conflict resolution in the presence of ACLs that can change.

The basic sync protocol consists of the initiator requesting deltas by sending a generation vector (similar to version vector) to the responder to communicate its current state. The responder in turn compare the initiator's generation vector with its own, and sends the missing deltas to the initiator, catching it up to the current state. Storage service syncs data specified by key prefixes and allows nested sync groups. To support this, the basic protocol is enhanced by sending a knowledge vector instead of a version vector. A knowledge vector includes a generation vector per prefix being synchronized. The knowledge vector may allow more efficient communication of deltas when a node is partially up-to-date. For example, if a node is already current w/r/t prefix "foo", and would like to catch up regarding prefix "f", sending a knowledge vector consisting of prefixes "foo" and "f" to a node that contains data for prefix "f" makes the delta exchange more efficient by sending the deltas belonging to prefix "f" and not "foo." The knowledge vectors are compact since key prefixes are being used and their hierarchical nature is being leveraged.

This knowledge-based sync protocol may be enhanced to support security. Each synced data item in storage service may be associated with a prefix ACL. All the ACL objects are sent to the initiator. However, before sending deltas, the responder checks if the initiator has read access as per the associated ACL. If it has access, the data is sent. If not, the data part of the delta is removed (shelled) and the sync metadata is sent. The exchanged sync metadata allows the initiator to keep a directed acyclic graph (DAG) consistent to detect conflicts, but does not reveal the data. Similarly, when the initiator receives deltas, it validates each update by verifying that the signer of the mutation has access to update the data as per the associated ACL. Thus, a malicious node cannot inject updates into the system without access. When the initiator receives data, it performs conflict detection, and if a conflict is detected, it performs conflict resolution. During conflict resolution, it is possible that the initiator does not have access to the conflicting data (shell). If the initiator needs this data to resolve the conflict, it delays the resolution, relying on a node with more permissions to resolve such conflict. However, if the conflict resolution merely relies on sync metadata (last timestamp wins), the initiator can complete the resolution and proceed with updating its store. Other possible conflicts include ACL-data conflicts or ACL-ACL conflicts. ACL-ACL conflicts may be automatically resolved by storage service by a conservative merge policy. In an ACL-data conflict, a potential policy includes admitting all concurrent mutations and enforcing that a sync group member is not out of sync for a long duration. Further, when an ACL denies access, the denial of access may not be permanent. This is possible because of an ACL containing a group in which the group initially denies access, but later allows access; or because of caveats that went from invalid to valid; or because of blessings that are renewed after expiry; or because new blessings were obtained. In such cases, every node tracks to see if any ACL changes affect its access, and if so, contacts other nodes to backfill the information they are missing.

Data exchange may be driven by version vectors (which also may be referred to as generation vectors). A version vector may include a version number per device participating in sync, which may help support nested and overlapping sync groups. During sync, the peer requesting deltas encapsulates its current state using its version vector. The peer receiving the request may compare the incoming version vector with its own and sends the missing versions of the data. The request for deltas may be proportional to the number of devices in the system, and the response may be proportional to the deltas.

In an embodiment, each generation vector may be attached to a set of data items, which may be referred to as a knowledge fragment. This may convey the current version for those data items. Given that sync groups are defined with prefixes, knowledge may also be encoded using prefixes. Prefixes may enable a compact representation of knowledge.

In an embodiment, once deltas are received, the receiver may replay the missed version history of an object and may detect if there are any conflicting updates. The object history used to detect conflicts may be maintained in the form of a DAG.

Data Exchange Protocol

In an embodiment, a local update on a device may be logged with a unique generation number. Each device may also maintain the log records received while synchronizing. During sync, the peer requesting deltas may encapsulate its current state using it version vector (a generation number per device). The peer receiving the request may compare the incoming version vector with its own and send the missing log records.

Figure 3:
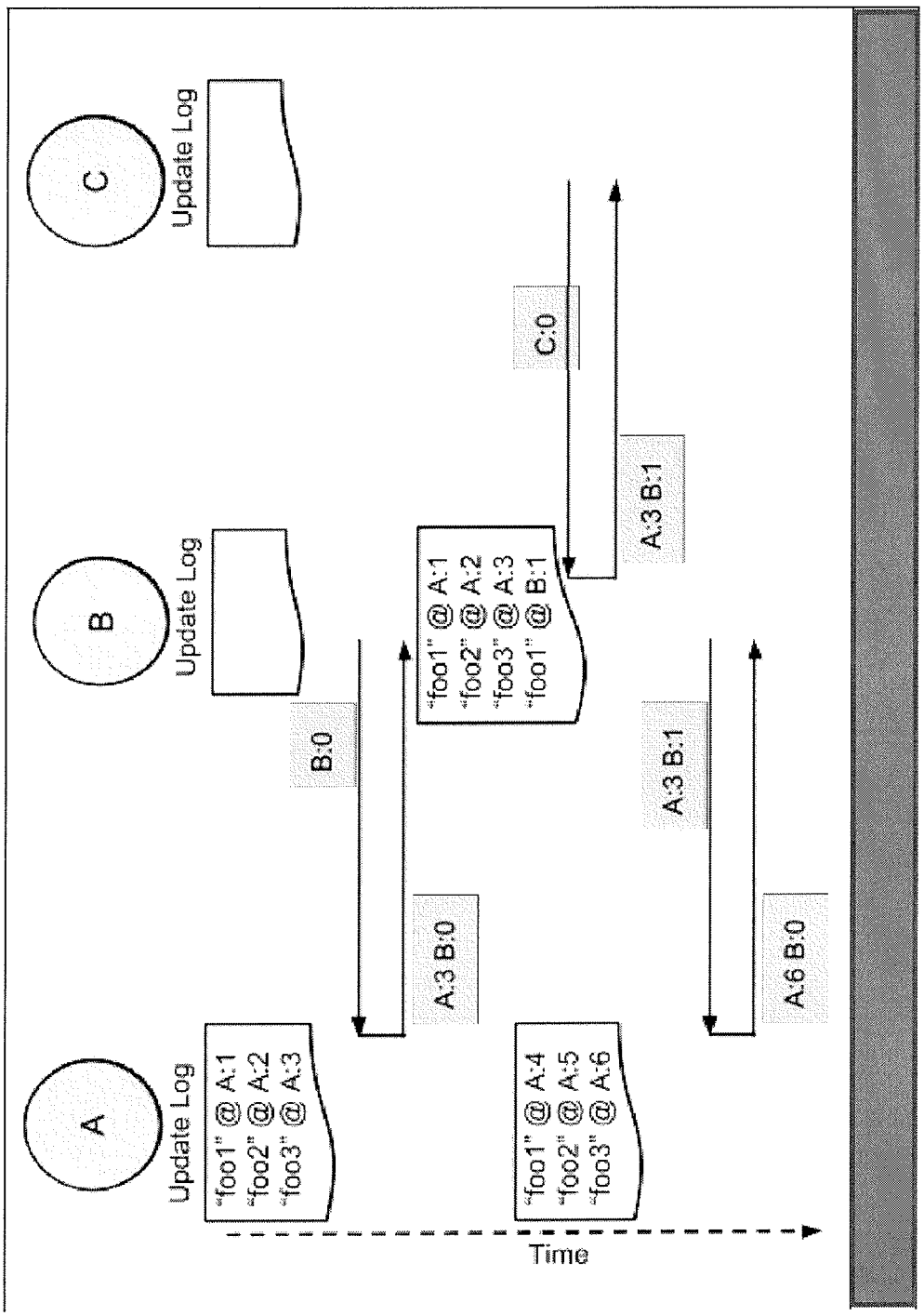
FIG. 3 illustrates an example data exchange according to an embodiment.

FIG. 3 illustrates an example data exchange according to an embodiment. As shown in FIG. 3, an example sync group may include devices A, B, and C, and the prefix may be set to "foo." At time t=0, device A has three updates, while devices B and C have not mutated any data. As illustrated by FIG. 3, device B (initiator) talks to device A (responder) to learn of any updates. Device B informs device A of its current state using a genvec [foo: {B:0}]. Device A uses it to determine the updates that device B doesn't have yet, by computing a difference against its own genvec. Since device A is at A:3, it may send three log records to device B. At the completion of the synchronization, device B may update its genvec to [foo: {A:3, B:0}].

In an embodiment, after device A syncs with device B, device A may mutate the keys and is now at A:6. B may mutate one of the keys resulting in B:1. Device C may sync from device B may inform device C of all the updates it knows about, from itself and from device A (A:3, B:1). Thus, device C may learn of updates from device A transitively through device B.

When device B initiates to device A again with a genvec of [foo: {A:3, B:1}], device A may send the incremental updates A:4-A:6. Thus, the communication between devices may be proportional to the size of the delta between them.

Conflict Detection/Resolution

In an embodiment, each sync log record exchanged between devices may specify the key of the object mutated, its globally unique version, and the version(s) from which this version is derived (i.e., its parent versions). These child-to-parent links may be used to create, for each object, a DAG representing its mutation history. Each node in the DAG may represent a version of the object. The DAG may be used to detect conflicts and may record conflict resolutions.

Figure 4:
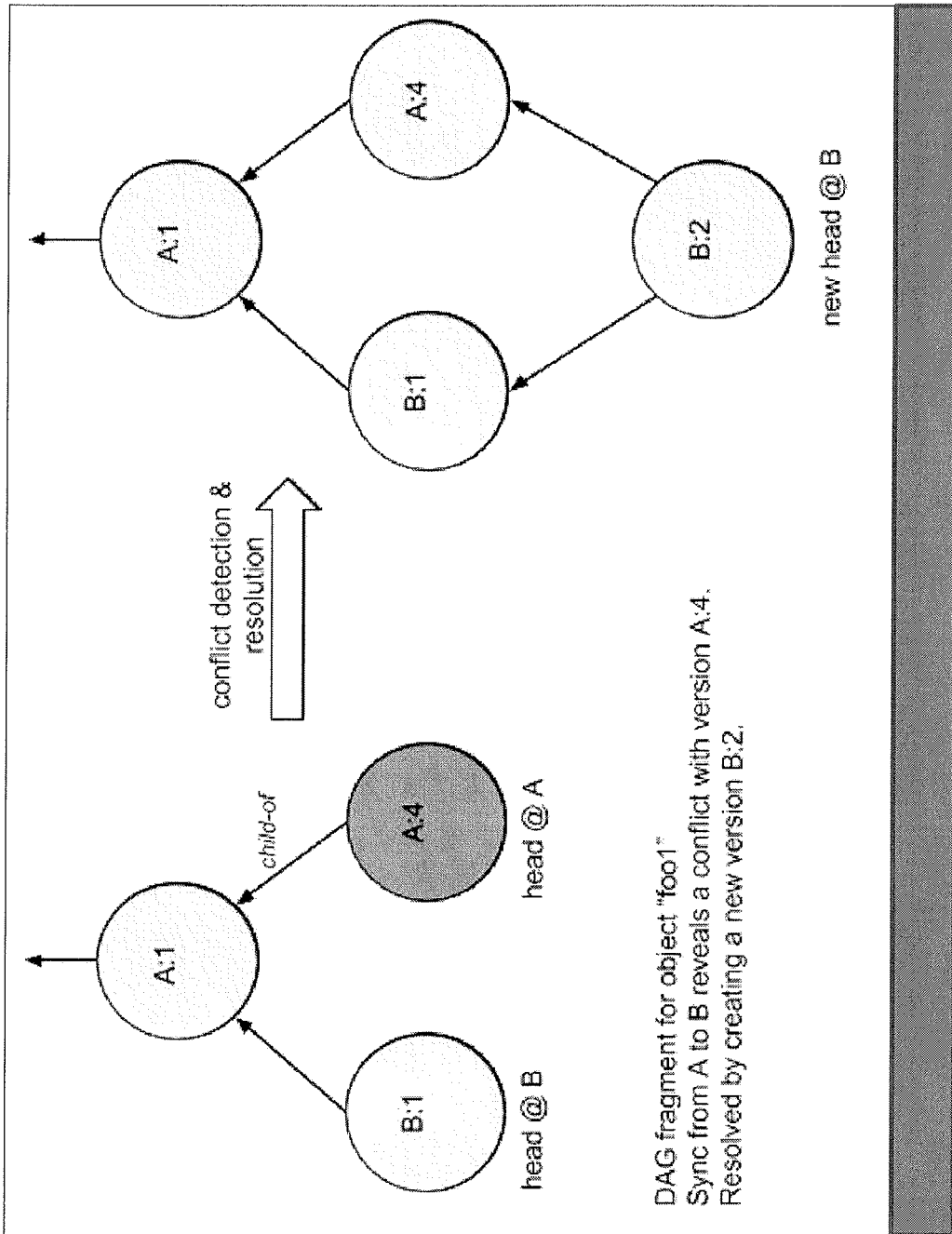
FIG. 4 illustrates an example of conflict resolution according to an embodiment.

When a parent node has multiple children, a conflict may be detected since each child represents a concurrent mutation made on different devices. When the conflict is resolved, the new version may be represented by a node with multiple parents as seen in FIG. 4.

In an embodiment, when a conflict is detected, the resolution policy may be given the triplet: (local head, remote head, common ancestor). This may allow the resolver to perform a three-way merge and determine the new result. The receiver may reply in one of the following ways: select the local head version, select the remote head version or return a new version.

Referring back to the example above with respect to FIG. 3, every time device B syncs with device A, it replays the new updates locally to reconstruct the version history of the objects involved (i.e., update the DAG of each object). At the end of the first sync, since device B has no changes, all updates from device A are applied without any conflict. At the end of the second sync, since device A is the one device that mutated keys "foo2" and "foo3", these keys have no conflict. Key "foo1" however has two simultaneous changes, and a conflict is detected. The resolver is given the data for version (B:1, A:4, A:1) and may return the new data for version B:2.

For conflict resolution to eventually converge to a consistent result, it is important that devices learn and piece together the same DAG structure for each known object. At different times, devices may know varying subsets of the DAG, but as they communicate DAG fragments to one another, they eventually construct the same DAG from the fragments.

Depending on the order in which devices communicate with each other, conflict resolution may happen on some devices and not others. For the system to be eventually consistent, devices may resolve conflicts in a deterministic and convergent manner. For example, if each device were to select its own version when resolving a conflict, endless cycles of conflict detection and resolution could result.

Deterministic conflict resolution is important because different devices may detect the same conflict concurrently (e.g., the same triplet (B:1, A:4, A:1) above) and each one resolves it locally before communicating with others. This may result in duplicate conflict resolutions, each with its unique version counter. When they are later exchanged, some devices may detect them as yet another conflict, but one between equivalent conflict resolutions (the same set of parents).

If the conflict resolver is deterministic, it may generate the same resolution data for equivalent conflicts. In this case, sync may automatically resolve this conflict between duplicate resolutions by deterministically selecting one of the two as the winner, without involving the application. However, if the values were different, it may trigger another conflict resolution for the application and may lead to an endless cycle of false conflicts between concurrent conflict resolutions. Thus the following conditions may be true for sync to converge:

All devices eventually learn of the same DAG for an object.

All devices resolve a conflict in the same manner, specifically:

Deterministic: devices resolving the same conflict result in identical data.

Commutative: same conflict resolution outcome irrespective of the order in which the two versions of a conflict are discovered.

Associative: same conflict resolution outcome irrespective of the order in which multiple conflicting changes are discovered and resolved (different intermediate resolutions).

Idempotent: the same conflicting data should generate the same resolution data irrespective of the actual version of the mutation.

Handling Nested/Overlapping Prefixes

In various embodiments, the data exchange protocol described above may handle sync groups with nested/overlapping prefixes. In such situations, the genvec used in communication may be attached to a specific prefix, and hence devices can easily summarize their knowledge across different prefixes. In addition, version numbers may be per device and hence comparable across prefixes.

Figure 5:
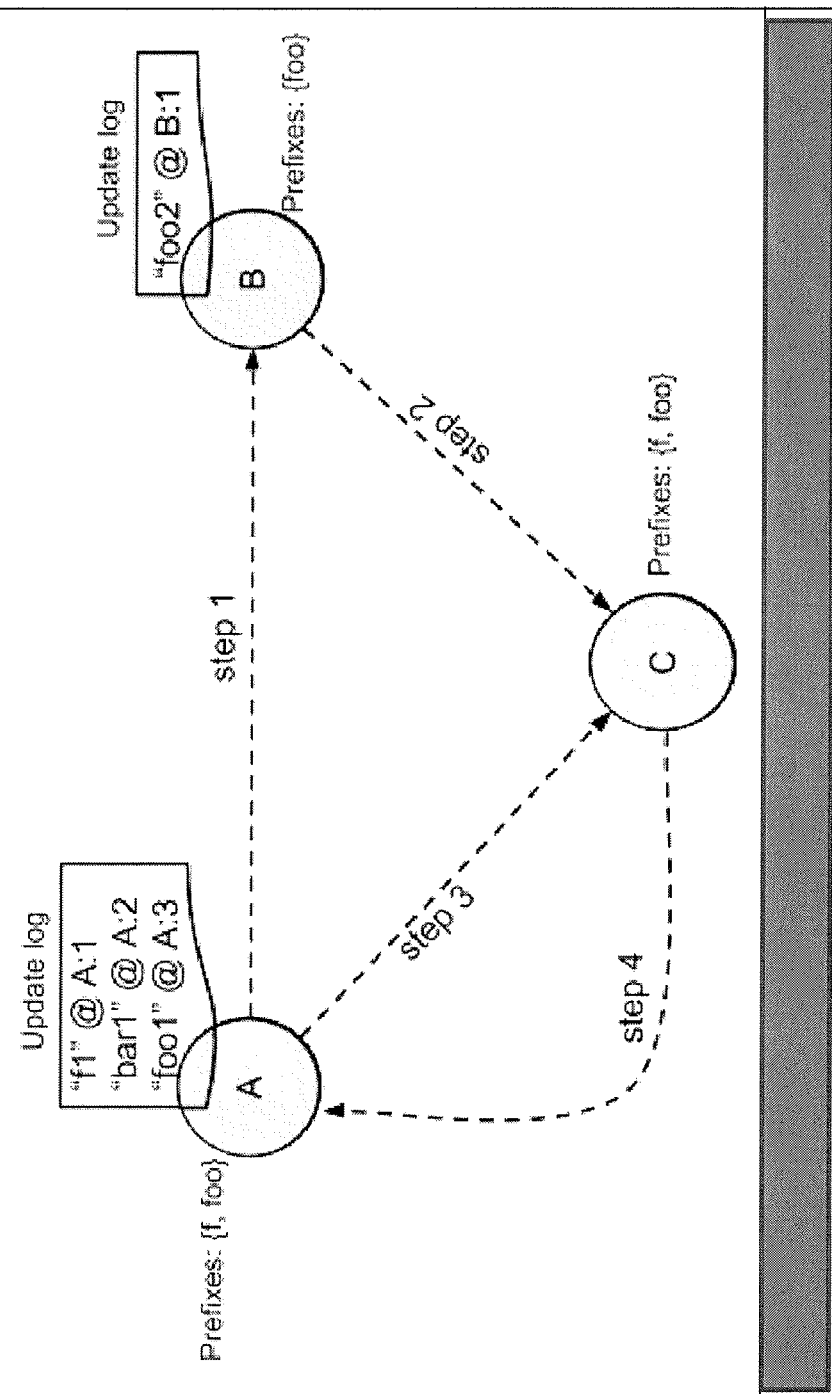
FIG. 5 illustrates an example sync group setup according to an embodiment.

For example, FIG. 5 illustrates three devices (A, B, C) with the following sync groups:

Sync group SG1 with prefix set ["foo"] and members A, B, and C.

Sync group SG2 with prefix set ["f"] and members A and C.

At time t=0, device A's update log has three mutations, while device B has a mutation on key "foo2".

Device B (initiator) may communicate with device A (responder) to obtain updates (note that A and B know of each other since they are both members of the SG1). Device B initiates with a genvec of [foo: {B:1}]. Since device B is interested in keys starting with prefix "foo", device A filters its changelog to obtain updates belonging to prefix "foo". Thus, device A replies to device B with 1 log record (foo1 @ A:3) and a genvec of [foo: {A:3, B:1}]. As such, device B is up-to-date with updates from device A.

Device C may initiate to device B with a genvec of [foo: {C:0}]. Note that device C requests those prefixes from device B which are common between itself and device B (because they are members of the same sync groups). Since device B participates in SG1, it responds with all the updates for keys with prefix "foo". This encompasses two log records (foo1 @ A:3 and foo2 @ B:1). Device B responds with a genvec of [foo: {A:3, B:1, C:0}].

Device C initiates to device A with a genvec of [f: {C:0}, foo: {A:3, B:1, C:0}]. For prefix "f", device A starts at the beginning and computes the relevant log records (f1 @ A:1). For prefix "foo", it starts at {A:3, B:1, C:0} to compute the new deltas. Thus, device A responds with a genvec of [f: {A:3, C:0}, foo: {A:3, B:1, C:0}] to get device C up-to-date.

Note that by fragmenting the knowledge (splitting into two genvecs, one for prefix "f" and one for "foo"), devices A and C communicate more efficiently. Device A did not resend keys belonging to "foo" that Device C already had, and sent the keys for prefix "f".

Device A initiates to Device C with a genvec of [f, foo: {A:3}]. Device C computes the deltas and sends (foo2 @ B:1) back to Device A with a genvec of [f: {A:3, C:0}, foo: {A:3, B:1, C:0}]. Thus, Device A can successfully catch up with device B's updates on the "foo" prefix transitively through device C.

Note however that device C cannot compact the knowledge it learned (i.e. learn that [f, foo: {A:3, B:1, C:0}]) even when "foo" is a subset of "f". This is because it has no way of knowing what device B's status is for the prefix f.

As an example, a device D may exist that is a member of SG2. When device D communicates with device A or C, it learns of the fragmented knowledge [f: {A:3, C:0}, foo: {A:3, B:1, C:0}]. Thus, when syncing about prefix "f" that has a nested sync group on "foo", members of the "f" sync group see a genvec on the "foo" subset. However, a member of the "foo" sync group will not see the existence of the "f" sync group.

ACL Visibility

A fine-grained ACL may be defined on a key prefix and applies to a range of keys, including keys not yet created. These ACLs may also be synchronized using the p2p protocol to allow their enforcement on all devices. When an ACL denies a device read-access to data, the data is not sent (see the protocol below). However, the ACL itself may be sent to that device so it could locally block the app from accessing the store within the range of that ACL and allow a storage service to provide the expected app behavior.

If the ACL were not sent, the storage service on that device would allow the app to create data objects and other ACLs within that range, or even to create a different version of that same ACL. This would lead to logically split sync groups forming sub-cliques of synchronization that do not converge. It would be confusing for the app developer and harder to debug. For this reason, the protocol may send all ACLs to all devices in the sync group and uses the ACLs to deny some devices access to the data protected by the ACLs, while providing visibility as to why the data access is denied. All devices in a sync group see and enforce the same rules for data access. While this scheme may leak the existence of keys to those members that do not have access to those keys, the keys are likely to be a series of UUIDs. The row keys have very little meaning other than their existence.

Optionally, to be more protective, the ACL may be anonymized and a denial of access may be conveyed to a device instead of sending the entire ACL.

Heisen-ACLs

Blessings and ACLs may be created such that the outcome of an ACL check changes without either ACL or blessing having been modified. Currently, this can happen when:

ACLs use groups: Group membership changes on the ACL Group Server.

Blessings have caveats:
  Time-based caveat: For example, when a blessing is valid on a weekday from 95.
  Third-party caveat: For example, a blessing is valid when the device is near a specific other device.
  Expiry caveat: For example, a blessing is valid for 24 hours.

Such ACLS are referred to as Heisen ACLs. Even caveats such as the expiry caveat are not restricted to "allowed" to "denied" transitions. An expired blessing may be renewed, thereby regaining access. As there may be uncertainty about these ACLs, the name Heisen-ACL is a pun on the Heisenberg uncertainty principle.

Enhanced Data Exchange Protocol: "Shells"

A log record exchanged during sync may contain a reference to the ACL on that version of the object. If that ACL denies read-access to a device that is a member of the sync group, this object mutation cannot be sent as-is. But something may be sent to indicate that the device lost access to this object, and as mentioned before, the DAG structure may also be maintained.

In this case the log record sent may be stripped down to remove the object data from it, becoming a shell of its former self. This is referred to as sending a DAG shell as opposed to a regular full DAG node. The shell may include one or more of the following:
  The object key
  The object version
  The object parent version(s)
  A reference to the specific ACL version that controls this object
  A boolean flag to indicate that it is shell record The shell may inform the receiving device that the object is no longer visible to its app. Storage service updates the ACL in the store, which blocks the app from accessing the object. If at a later time the ACL is changed to re-enable access for that device, it receives that new mutation as a regular full DAG node and storage service updates the object and its new data and ACL in the store, making it visible to the app.

In an embodiment, for objects that are created invisible to some devices from the beginning, the protocol may send a shell that is further stripped down to remove the object key and its parent versions, keeping the object version, the reference to the specific ACL version that controls the object and the Boolean flag. This may avoid exposing the existence of the object key, which may contain app metadata, to a device that does not yet know about it and has not yet gained access. This reduced shell contains enough information (namely object version) to allow storage service to attempt re-fetching the data to check whether it has gained access, and delays sharing the object key until access is granted.

Figure 6:
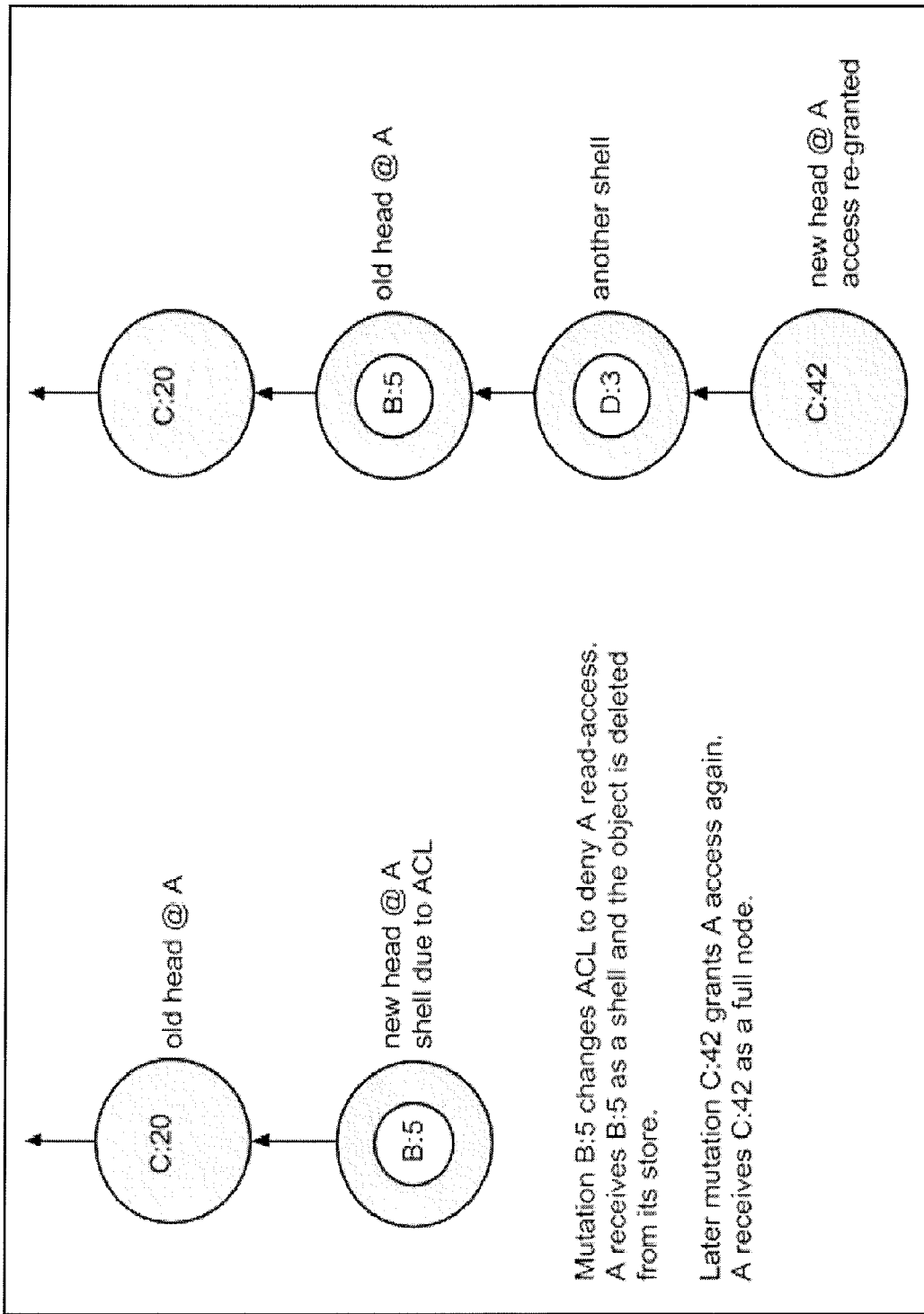
FIG. 6 illustrates examples of object visible/invisible transitions according to an embodiment.

FIG. 6 illustrates examples of object visible/invisible transitions according to an embodiment.

Conflict Detection and Resolution with Shells

The existence of shells in the DAG may have ramifications on conflict detection and resolution. For example, if a shell is the common ancestor of a conflict and the resolver is known to need the common ancestor, then conflict resolution may be skipped at this device. Another device with access to that common ancestor may need to eventually resolve the conflict. Effectively, the object DAG on the device remains "open" with a dangling fragment not merged back with the local head version until another device resolves the conflict and sends back the resulting DAG fragment that merges it. The device may continue to make progress on its own version of the object and also learn about mutations derived from the other head (the dangling fragment), it cannot just tie the two fragments and resolve the conflict on its own.

As another example, if a shell is a common ancestor but the conflict resolver does not need it (e.g. last-timestamp wins), then conflict resolution is done.

As another example, if a shell is either the local or the remote head, an ACL-data conflict or an ACL-ACL conflict may exist: the device made a data or ACL change while another device changed the ACL (maybe also the data) to deny read-access to this device. The resolution may be skipped and left for another device that has visibility to both changes to decide how to resolve it.

Conflict resolution may not happen on an object with incomplete information because it may violate the convergence requirement of having the same conflict resolved the same way on any device. Devices with incomplete knowledge may defer resolution to other devices.

A device may request and accept sync updates from another device that is allowed in the sync group per the sync group ACL (membership verification). The incoming data, full nodes and shells, may be attached to the DAG. Access to each data object may be protected by the setting of a Prefix-ACL object (the one with the longest matching prefix), and the ACL object is also synchronized (similar to data objects using full nodes or shells).

Conflict resolution between versions of an ACL object may be handled first. Given that the ACL schema is known to storage service, conflict resolution is done automatically according to a policy selected when the sync group is created.

When resolving a conflict between data objects, the ACL settings may be taken into consideration to determine whether the remote version should be visible to the local device or ignored.

Refetching Shells and Promotion to Full DAG Node

As most fined-grained ACLs are Heisen-ACLs, an access denial may be ephemeral and access may be granted if the ACL check is retried later (e.g. time or location-based caveats). This may be important for shells that have important roles in the DAG such as, for example. a shell as a head node of a non-conflicting DAG fragment, a shell as another head node in a DAG conflict, or a shell as a common-ancestor of a conflict that requires the common ancestor for resolution (as opposed to policies like last-one-wins that do not need the ancestor).

Storage service may track the subset of the DAG shells it has that are deemed important and asks the next device it synchronizes with to recheck access to these specific mutations. It may do this by sending, along with its genvec, the list of past mutation versions to fetch in addition to the new delta of log records. The responding device may use this genvec to compute the deltas. It may add to this regular reply any of the past log records if the requesting device passes the ACL check on them this time around.

In effect this action may fill the missing information for some of the shells, promoting them from shells to full DAG nodes. The receiving device may take the appropriate action such as resolving conflicts that were still pending and updating the head nodes and their values in the store. Optionally, the protocol may request all the shell nodes, instead of just those deemed important.

The list of past mutations may be encoded to reduce the bytes on the wire (size of the request): (1) Run-length encoding or compression, (2) Using two round trips sending the list of previously denied ACLs in the first round trip to determine which are now allowed and in the second trip sending the list of past mutations that match the newly allowed ACLs.

Figure 7:
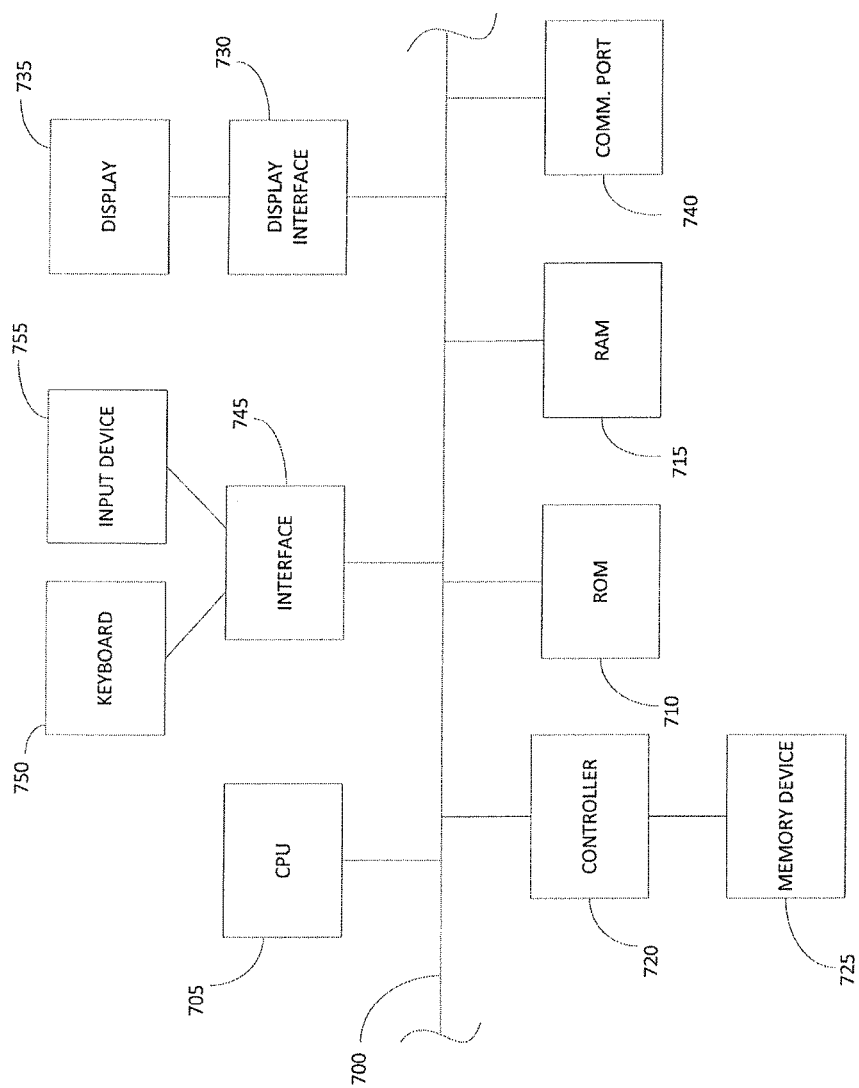
FIG. 7 illustrates a block diagram of example hardware that may be used to contain or implement program instructions and communication with other devices according to various embodiments.

FIG. 7 depicts a block diagram of hardware that may be used to contain or implement program instructions. A bus 700 serves as an information highway interconnecting the other illustrated components of the hardware. Processor (CPU) 705 is a central processing device of the system, performing calculations and logic operations to execute a program. CPU 705 is an example of a production device, computing device or processor as such terms are used within this disclosure. Read-only memory (ROM) 710 and random access memory (RAM) 715 constitute examples of non-transitory computer-readable storage media.

A controller 720 interfaces with one or more optional non-transitory computer-readable storage media (i.e., memory device 725) to the system bus 700. These storage media may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 710 and/or the RAM 715. Optionally, the program instructions may be stored on the storage media 725 discussed above.

An optional display interface 730 may permit information from the bus 700 to be displayed on the display 735 in audio, visual, graphic or alphanumeric format. Communication with external devices, such as a printing device, may occur using various communication ports 740. A communication port 740 may be attached to a communication network, such as the Internet or an intranet.

The hardware may also include an interface 745 which allows for receipt of data from input devices such as a keyboard 750 or other input device 755 such as a mouse, a touch pad, a touch screen, a remote control, a pointing device, a video input device and/or an audio input device.

The features and functions described above, as well as alternatives, may be combined into many other different systems or applications. Various alternatives, modifications, variations or improvements may be made by those skilled in the art, each of which is also intended to be encompassed by the disclosed embodiments.

What is claimed is:

1. A method of creating a sync group, the method comprising:
   receiving, by a storage service associated with a first electronic device, a request from an application to create a sync group, wherein the first electronic device is offline;
   verifying, by the storage service, that the application has read access to the storage service;
   in response to verifying that the application has read access to the storage service, creating locally within the storage service the sync group by:
      receiving an indication of one or more objects stored in the storage service that are to be shared,
      identifying one or more user members of the sync group with whom to share the one or more objects, each user member associated with one or more member electronic devices, and
      assigning one or more permissions of a set of possible permissions to the one or more member electronic devices associated with the user members that are identified, the set of possible permissions including read access, write access, and administrative access;
   synchronizing access to the objects among the offline first electronic device and the one or more member electronic devices associated with the one or more user members such that the objects are accessible via each of the member electronic devices when the member electronic devices are within range of a short range communication transmitter of the offline first electronic device, wherein access to the objects by the member electronic devices is synchronized in accordance with the one or more permissions that are assigned and in accordance with one or more conflict resolution policies;
   detecting, by the first electronic device, a network connection that facilitates communications with a sync group server; and
   sending, by the first electronic device via the detected network connection, information identifying the sync group to the sync group server for continued synchronization through the sync group server when the one or more member electronic devices are no longer within range of the short range communication transmitter of the first electronic device.

2. The method of claim 1, further comprising:
assigning a unique name to the sync group; and
publishing the unique name to a listing that is accessible by the member electronic devices.

3. The method of claim 1, wherein each of the member electronic devices is offline.

4. The method of claim 1, further comprising assigning a unique name to the sync group.

5. The method of claim 1, wherein assigning the one or more permissions comprises generating an access control list (ACL) that indicates which of the member electronic devices are permitted to access the objects.

6. A method of creating a sync group, the method comprising:
receiving, by a storage service associated with a first electronic device, a request from an application to create a sync group;
verifying, by the storage service, that the application has read access to the storage service;
in response to verifying that the application has read access to the storage service, creating locally within the storage service the sync group by:
receiving an indication of one or more objects stored in the storage service that are to be shared,
identifying one or more user members of the sync group with whom to share the one or more objects, each user member associated with one or more member electronic devices, and
assigning one or more permissions of a set of possible permissions to the one or more member electronic devices associated with the user members that are identified, the set of possible permissions including read access, write access, and administrative access,
identifying a sync group server associated with the sync group;
detecting a network connection that facilitates communications with the sync group server;
sending a notification to the sync group server using the detected network connection, the notification notifying the sync group server that the sync group has been created locally within the storage service; and
synchronizing access to the objects among the first electronic device and one or more member electronic devices associated with the one or more members such that the objects are accessible via each of the member electronic devices at any time regardless of whether the first electronic device is executing the application at that time, wherein access to the objects by the member electronic devices is synchronized in accordance with the one or more permissions that are assigned and further in accordance with one or more conflict resolution policies.

7. The method of claim 6, further comprising:
assigning a unique name to the sync group; and
publishing the unique name to a listing that is accessible by the member electronic devices.

8. The method of claim 6, further comprising assigning a unique name to the sync group.

9. The method of claim 6, wherein assigning one or more permissions comprises generating an access control list (ACL) that indicates which of the member electronic devices are permitted to access the objects.

10. The method of claim 6, wherein sending a notification to the sync group server comprises communicating with the sync group server using one or more remote procedure calls.

11. A system for creating a sync group in a distributed system, the system comprising:
an electronic device comprising a short range communication transmitter and a storage service, wherein the electronic device is offline; and
a computer-readable storage medium comprising one or more programming instructions that, when executed, cause the offline, electronic device to:
receive a request from an application to create a sync group,
verify that the application has read access to the storage service,
in response to verifying that the application has read access to the storage service, create locally within the storage service the sync group by:
receiving an indication of one or more objects stored in the storage service that are to be shared,
identifying one or more user members of the sync group, each user member associated with one or more member electronic devices, and
assigning one or more permissions of a set of possible permissions to the one or more member electronic devices associated with the user members that are identified, the set of possible permissions including read access, write access, and administrative access;
synchronizing access to the objects among the offline, electronic device and the one or more member electronic devices associated with the one or more user members such that the objects are accessible via each of the member electronic devices when the member electronic devices are within range of the transmitter, wherein access to the objects by the member electronic devices is synchronized in accordance with the one or more permissions that are assigned and further in accordance with one or more conflict resolution policies;
detecting, by the first electronic device, a network connection that facilitates communications with a sync group server; and
sending, by the first electronic device via the detected network connection, information identifying the sync group to the sync group server for continued synchronization through the sync group server when the one or more member electronic devices are no longer within range of the short range communication transmitter of the first electronic device.

12. The system of claim 11, wherein the computer-readable storage medium further comprises one or more instructions that, when executed, cause the offline, electronic device to:
assign a unique name to the sync group so that the unique name includes a name of a sync group server; and
publish the unique name to a listing that is accessible by the member electronic devices.

13. The system of claim 12, wherein the computer-readable storage medium further comprises one or more instructions that, when executed, cause the electronic device to detect a network connection and in response, send a request to create the sync group to a sync group server.

14. The system of claim 12, wherein the one or more programming instructions that, when executed, cause the offline, electronic device to assign one or more permissions comprise one or more programming instructions that, when executed, cause the electronic device to generate an access control list (ACL) that indicates which member electronic devices are permitted to access the objects.

15. A system for creating a sync group in a distributed system, the system comprising:
an electronic device comprising a storage service; and
a computer-readable storage medium comprising one or more programming instructions that, when executed, cause the electronic device to:
receive a request from an application to create a sync group,
verify that the application has read access to the storage service,
in response to verifying that the application has read access to the storage service, create locally within the storage service the sync group by:
receiving an indication of one or more objects stored in the storage service that are to be shared,
identifying one or more user members of the sync group, each user member associated with one or more member electronic devices, and
assigning one or more permissions of a set of possible permissions to the one or more member electronic devices associated with the user members that are identified, the set of possible permissions including read access, write access, and administrative access,
identify a sync group server associated with the sync group,
detect a network connection that facilitates communications with the sync group server:
send a notification to the sync group server using the detected network connection, the notification notifying the sync group server that the sync group has been created locally within the storage service, and
synchronize access to the objects among the electronic device and one or more member electronic devices associated with the one or more members such that the objects are accessible via each of the member electronic devices at any time regardless of whether the first electronic device is executing the application at that time, wherein access to the objects by the member electronic devices is synchronized in accordance with the one or more permissions that are assigned and further in accordance with one or more conflict resolution policies.

16. The system of claim 15, wherein the computer-readable storage medium further comprises one or more programming instructions that, when executed, cause the electronic device to:
assign a unique name to the sync group so that the unique name includes a name of the sync group server; and
publish the unique name to a listing that is accessible by the member electronic devices.

17. The system of claim 15, wherein the computer-readable storage medium further comprises one or more programming instructions that, when executed, cause the electronic device to assign a unique name to the sync group so that the unique name includes a name of a sync group sever.

18. The system of claim 15, wherein the one or more programming instructions that, when executed, cause the electronic device to assign one or more permissions comprise one or more programming instructions that, when executed, cause the electronic device to generate an access control list (ACL) that indicates which member electronic devices are permitted to access the objects.

19. The method of claim 1, further comprising:
receiving a first modification to a particular object of the one or more objects from the offline first electronic device;
receiving a second modification to the particular object from a second device of the one or more member electronic devices;
determining that a conflict exists between the first modification and the second modification;
resolving the conflict by selecting one of the first modification and the second modification based the ancestry record of modifications made to the particular object and in accordance with the one or more conflict resolution policies, wherein the one or more conflict resolution policies include one or more deterministic rules for selecting modifications made by members of the sync group.

* * * * *